United States Patent [19]
Mintz

[11] Patent Number: 5,855,231
[45] Date of Patent: Jan. 5, 1999

[54] CASING AND METHOD FOR FORMING A RIPPLED MEAT PRODUCT

[76] Inventor: Neil Mintz, 7129 Rockrose Ter., Carlsbad, Calif. 92009

[21] Appl. No.: 921,444

[22] Filed: Aug. 29, 1997

[51] Int. Cl.[6] .............................. F16L 11/00; A22C 13/00
[52] U.S. Cl. ..................... 138/118.1; 138/118; 428/34.8; 428/36.1
[58] Field of Search .................... 138/118.1, 123, 138/124; 428/36, 156, 159, 34.1, 34.3, 34.8; 66/178.2, 180, 181, 201, 202

[56] References Cited

U.S. PATENT DOCUMENTS

| | | | |
|---|---|---|---|
| 698,499 | 4/1902 | Hirner | 66/180 |
| 1,505,218 | 8/1924 | Sartore | 452/35 |
| 1,981,057 | 11/1934 | Lombardi | 66/180 |
| 2,289,302 | 7/1942 | Bradshaw | 66/195 |
| 2,366,710 | 1/1945 | Dimond | 99/176 |
| 2,375,474 | 5/1945 | Holmes et al. | 66/180 |
| 2,500,759 | 3/1950 | Largman | 66/180 |
| 2,977,782 | 4/1961 | Sheek | 66/178 R X |
| 3,159,990 | 12/1964 | Monday | 66/180 |
| 3,448,595 | 6/1969 | Baltzer et al. | 66/195 X |
| 3,639,130 | 2/1972 | Eichin et al. | 99/175 |
| 4,621,482 | 11/1986 | Crevasse et al. | 53/439 |
| 4,690,843 | 9/1987 | Inagaki | 138/118.1 |
| 4,967,798 | 11/1990 | Hammer et al. | 138/118.1 |
| 5,043,194 | 8/1991 | Siebrecht et al. | 138/118.1 X |
| 5,413,148 | 5/1995 | Mintz et al. | 138/118.1 |

FOREIGN PATENT DOCUMENTS

| | | |
|---|---|---|
| 726424 | 1/1966 | Canada . |
| 2563813 | 11/1985 | France . |
| 106965 | 5/1984 | Germany . |
| 546325 | 9/1956 | Italy . |
| 7614318 | 7/1977 | Netherlands . |
| 9001395 | 1/1992 | Netherlands . |
| 393122 | 10/1965 | Switzerland . |
| 594359 | 9/1977 | Switzerland . |
| 9601565 | 1/1996 | WIPO . |

OTHER PUBLICATIONS

303328 European Patent Office Herbert Jager, Feb. 1989.
WO 90/10576 WIPO Miexner et al., Sep. 1990.

*Primary Examiner*—Patrick F. Brinson
*Attorney, Agent, or Firm*—Brown, Martin, Haller & McClain

[57] ABSTRACT

A casing for forming a rippled meat product includes a generally tubular stockinette fabric integrally knitted with a restrictive structure. The restrictive structure may include one or more helical threads. The differential expansion of the stockinette and the restrictive structure when the casing is stuffed creates a helical bulge in the surface of the meat product. The restrictive structure may include a chain of longitudinal connections that promote a decrease in the longitudinal spacing of the turns of the helical thread in response to the radial expansion of the helical thread during stuffing. Such a restrictive structure also facilitates a method for releasing the casing from the meat product following processing by severing the endmost connection in the chain. Alternatively or in addition, the restrictive structure may include a series of longitudinal jumps that similarly promote a decrease in the longitudinal spacing of the turns of the helical thread in response to the radial expansion of the helical thread during stuffing. The resulting slack or bunching in the stockinette fabric between adjacent turns or circumferential loops of the helical thread allows the meat to bulge outwardly.

35 Claims, 3 Drawing Sheets

CASING AND METHOD FOR FORMING A RIPPLED MEAT PRODUCT

BACKGROUND OF THE INVENTION

1. Field of the Invention

The present invention relates generally to knitted casings or nettings for encasing meat products during processing and, more specifically, to a casing comprising a stockinette integrally formed with one or more circumferential ribs for forming a meat product having a rippled or ribbed appearance.

2. Description of the Related Art

Meat products, such as hams, poultry and the like, are traditionally encased in a netting during the cooking and/or smoking processes. The meat tends to bulge through the netting, forming a visually pleasing pattern or texture of squares on the surface of the product when the netting is removed following processing. The extent to which the meat bulges through the netting depends upon its consistency and is difficult to control. As a result, in many meat products, portions of netting may become embedded in the meat during processing and hamper removal of the netting. The problem is particularly acute in forming products from raw meat mixtures in ground or emulsion form. To overcome this problem, the raw meat mixture may be stuffed into a casing made of a suitable synthetic, collagen, or knitted material prior to being encased in the netting. A knitted fabric casing is generally known as a stockinette. The finely knitted fabric stockinette is especially advantageous because it is permeable to smoke yet not sufficiently porous to allow the meat particles to penetrate it.

Practitioners in the art have improved upon the above-described process involving a stockinette and netting combination. U.S. Pat. No. 5,413,148 describes a casing comprising a finely knitted, relatively resilient or stretchable stockinette fabric integrally knitted with more widely spaced longitudinal and circumferential strands that are made of a heavier thread and are less resilient or stretchable. When the raw meat mixture is stuffed into the casing, the square areas of stockinette fabric bounded by the longitudinal and circumferential strands expand or stretch to a much greater extent than the strands, thereby forming the desirable pattern of square bulges on the surface of the meat.

A rippled surface texture resembling a series of annular bulges is desirable in certain types of ham products known as ripple hams or ribbed hams or, in certain regions of the United States, as Virginia hams. The most prevalent process comprises stuffing a raw meat mixture into a liquid-impermeable cook-in bag, placing the stuffed bag in a stainless steel mold having a concavely rippled interior surface texture, and cooking it in the mold. Following cooking, the product is removed from the mold and cook-in bag and chilled. To smoke the product, it is laid on a rack or hung in a stockinette in the smokehouse.

Handling, cleaning, maintaining and replacing stainless steel molds is uneconomical. It would be desirable to provide a method for forming rippled meat products that obviates the above-described molding step. These needs are satisfied by the novel method and casing of the present invention in the manner described below.

SUMMARY OF THE INVENTION

The present invention relates to a generally elongated, tubular casing for forming a rippled meat product that includes a generally tubular stockinette fabric integrally knitted with a restrictive structure. The stockinette fabric is sufficiently finely knitted to prevent meat from escaping during processing. The restrictive structure includes a plurality of circumferential loops of a suitable material such as thread longitudinally spaced from one another at a spacing corresponding to the desired ripple effect on the surface of the meat product. The restrictive structure is less stretchable than the stockinette fabric. The restrictive structure also includes a means for drawing the circumferential loops together. The drawing means promotes the formation of more pronounced ripples by encouraging radial expansion at the expense of longitudinal expansion. The drawing means inhibits longitudinal expansion, i.e., inhibits any increase in the longitudinal spacing of the circumferential loops, and may even promote a decrease in the longitudinal spacing. Thus, when the casing is stuffed, the areas of stockinette fabric between adjacent circumferential loops expand or bulge radially outwardly to a much greater extent than the restrictive circumferential loops. Following stuffing, the encased meat product may be processed in any suitable manner, including cooking and smoking it. The differential expansion of the stockinette fabric and restrictive circumferential loops produces the desired ripple effect on the surface of the meat product following processing.

An exemplary drawing means may be defined by longitudinal connections of the circumferential loops that connect adjacent circumferential loops to one another. When the casing is stuffed, the stockinette fabric between adjacent circumferential loops expands radially to a greater extent than longitudinally because the longitudinal connections restrict or inhibit longitudinal expansion between adjacent circumferential loops. In an embodiment of the invention in which a longitudinal connection is a loop drawn from a circumferential loop and through which another longitudinal connection of an adjacent circumferential loop extends, their combined effect during stuffing is to promote a decrease in the longitudinal spacing in response to their radial expansion.

Another exemplary drawing means may be defined by longitudinal jumps in the circumferential loops. When the casing is stuffed, the longitudinal jumps promote a decrease in the longitudinal spacing. The resulting slack or bunching in the stockinette fabric between adjacent circumferential loops allows the meat to bulge outwardly. Other, equivalent drawing means, including combinations of those described herein, would also be suitable.

In certain embodiments of the invention, the restrictive structure may be helical. In such embodiments, each circumferential loop constitutes one turn or revolution of the helix. Although the rippling of a traditional ripple ham is defined by a series of annular bulges, a meat product produced in accordance with the present invention will have a single helical bulge on its surface. The difference is nearly unnoticeable to a casual observer or consumer. Furthermore, the helix may be defined by two or more threads or other material of the restrictive structure spaced closely to one another relative to the longer spacing between successive loops of the helix. Including multiple threads in this manner rather than a single thread enables smoother, more wave-like ripples to be created in the meat product. In contrast, a single thread produces a sharper, more cusp-like depression in the meat.

A potential problem solved by the present invention is that a rippled casing may be difficult to remove from a meat product following processing because the distended casing conforms tightly to the rippled contours of the finished product. In the casing of the present invention, the longitudinal connections may each comprise a loop drawn from a circumferential loop and through which another longitudinal connection of an adjacent circumferential loop extends. The longitudinal connections may thus interlock in a chain-like manner from one end of the casing to the other. When the endmost longitudinal connection that extends through an adjacent longitudinal connection is severed, it releases the adjacent longitudinal connection. Each successive longitudinal connection in the chain in turn releases, thereby slackening the entire casing. In the slackened state, the casing may readily be removed from the processed meat product. The invention includes the method whereby the casing is released in this manner.

The method of the present invention also includes stuffing the casing until the ripples form. A step of compressing the stuffed casing under the force exerted by an external member or under its own weight may further be included to enhance the rippling.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
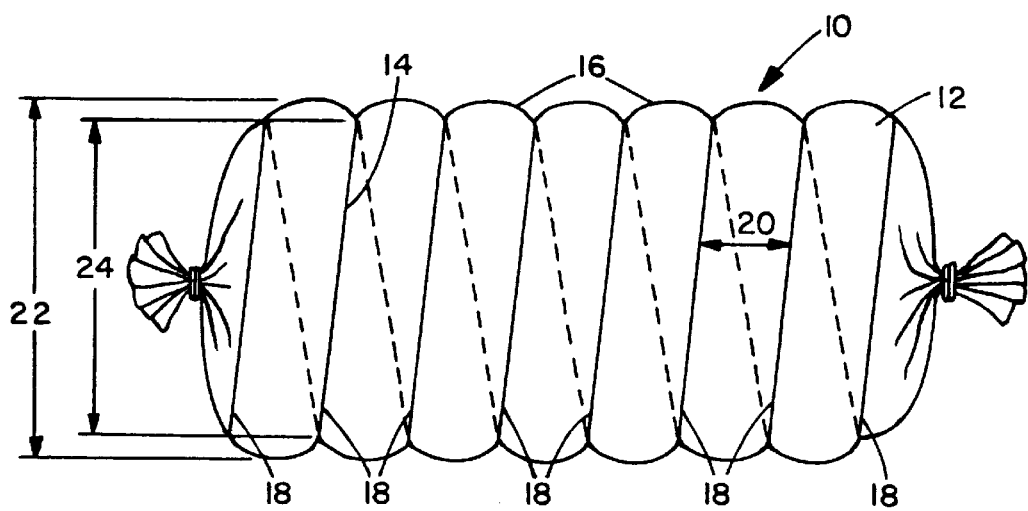
FIG. 1 is a side elevational view of a stuffed casing having a helical restrictive structure.

As illustrated in FIG. 1, a casing 10 includes a generally tubular, knitted stockinette fabric 12 and an integrally knitted helical thread 14. Helical thread 14 defines a restrictive structure that promotes the formation of ripples 16, as described further below. The highly pronounced ripples 16 are characteristic of the meat product formed in accordance with the present invention.

Helical thread 14 is defined by a number of circumferential loops 18. The longitudinal spacing 20 between adjacent circumferential loops 18 is preferably between about one-tenth and one-third the diameter 24 of the helix when casing 10 is in a stuffed state, as illustrated in FIG. 1. Stated another way, the ratio between longitudinal spacing 20 and diameter 24 is between about 0.10 and 0.33. Although casing 10 may be any suitable size, for forming a common type of ham product known variously as a ripple ham, ribbed ham or Virginia ham, the stuffed casing 10 preferably has a length of about twelve inches (30.48 cm), a diameter 22 of about seven inches (17.78 cm) at its maximum, a diameter 24 of about six and one-half inches (16.51 cm) at its minimum, and a longitudinal spacing 20 of about one inch (2.52 cm). These proportions and sizes are not absolutely critical, but they are important to forming a product that resembles a ripple ham formed using the conventional method in a stainless steel mold. If longitudinal spacing 20 is too small, for example, the ripples formed using such a casing may not be visible at all or may not be sufficiently pronounced to enable the product to be commercially viable. The present invention is specifically directed to a casing and method for forming a ripple or Virginia ham and not some other product.

Figure 3:
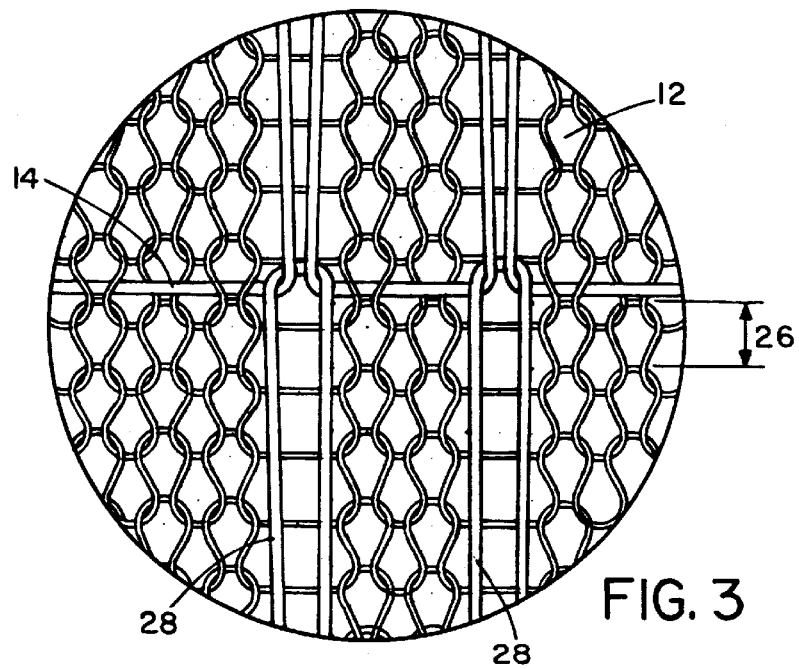
FIG. 3 is an enlargement of a portion of FIG. 2, illustrating the stitching of the stockinette fabric and the restrictive structure.

As illustrated in FIG. 3, stockinette fabric 12 is defined by a Jersey stitch that is sufficiently closely knitted to inhibit escape of meat particles. Although the closeness of the knit depends upon the extent to which casing 10 is stuffed, the stitching is preferably of a size that, when expanded to the extent described herein, has a spacing 26 between rows of the Jersey of about 1.0–2.0 mm. A spacing 26 of about 1.3 mm is especially preferred. The spacing between columns or wales of the Jersey is preferably the same as the spacing 26 between rows. The Jersey preferably has about 15–35 rows per inch (2.54 cm) of length of casing 10. As noted above, longitudinal spacing 20 is preferably about one inch. Thus, longitudinal spacing 20 is preferably about 15–35 rows, with 23 rows being especially preferred.

Helical thread 14 is integrally knitted with the Jersey, as described in further detail below. Helical thread 14 and stockinette fabric 12 may be made of any suitable material, such as cotton, polyester, or nylon threads or yarns.

Stockinette fabric 12 is much more stretchable than the restrictive structure defined by helical thread 14. The relative stretchability between stockinette fabric 12 and the restrictive structure defined by helical thread 14 has a pronounced effect on the extent of the rippling. When casing 10 is stuffed, both stockinette fabric 12 and the helical restrictive structure expand radially, i.e., in a direction transverse to the longitudinal axis of casing 10, but stockinette fabric 12 expands to a greater extent than the helical restrictive structure. Furthermore, as described further below, the radial expansion and longitudinal expansion of casing 10 are not independent. It is believed that under normal stuffing conditions, a sort of equilibrium is reached during stuffing at which point casing 10 cannot expand more in either a radial or longitudinal direction without being damaged. When casing 10 is in a stuffed state, the ratio of diameter 22 to diameter 24 is preferably between about 1.02 and 1.20. This range of ratios produces a ripple effect characteristic of traditional ripple hams.

It should be noted that the ratios and other parameters described herein with respect to casing 10 in a stuffed state may be measured without actually stuffing casing 10. Rather, the state of equilibrium may be observed and the parameters of casing 10 measured by applying an equal force radial force to each by, for example, placing a plastic bag (not shown) having roughly the same dimensions as casing 10 inside casing 10 and inflating it.

Figure 2:
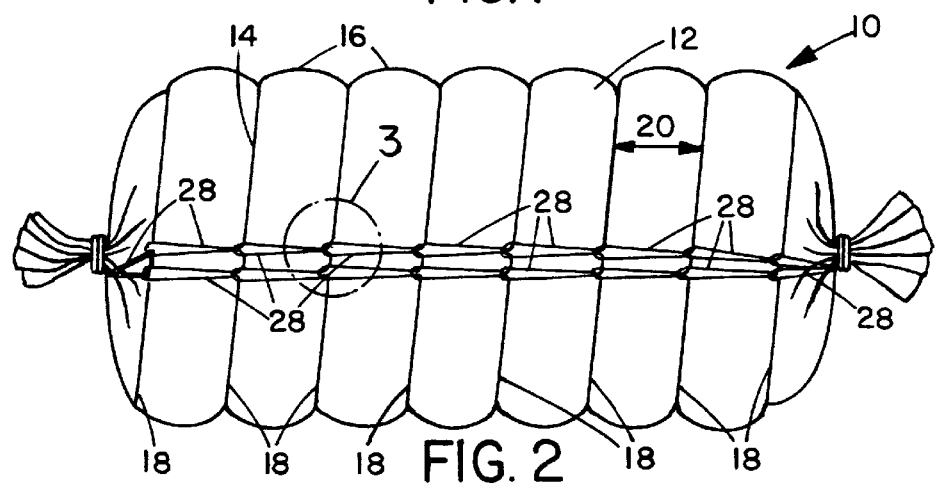
FIG. 2 is a side elevational view of a stuffed casing having a helical restrictive structure in which each circumferential loop of the helical restrictive structure has two longitudinal connections to an adjacent one of the circumferential loops.

The restrictive structure defined by helical thread 14 inhibits an increase in longitudinal spacing 20 in response to the pressure exerted during the stuffing of casing 10. As illustrated in FIG. 2, casing 10 may further include a means for drawing circumferential loops 18 together. In the embodiment illustrated in FIG. 2, such a drawing means is defined by a pair of longitudinal extension loops 28 of each of circumferential loops 18. Each circumferential loop 18 has two longitudinal extension loops 28 connecting it to an adjacent circumferential loop 18 in a chain-like manner. (In other embodiments, such as that illustrated in FIG. 4, each circumferential loop 18 may have exactly one longitudinal extension loop 28.) Each longitudinal extension loop 28 is an extension or loop drawn from a circumferential loop 18 and through which the next longitudinal extension loop 28 in the chain extends. The drawing means illustrated in FIG. 2 not only inhibits an increase in longitudinal spacing 20, but actually promotes a decrease in longitudinal spacing 20 in response to the pressure exerted during the stuffing of casing 10. In response to the stuffing pressure, the diameter of the restrictive structure defined by helical thread 14 increases. The radial expansion of each circumferential loop 18 is permitted by the contraction of its longitudinal extension loop 28. The collective effect is to draw all circumferential loops 18 closer to one another. Shortening longitudinal spacing 20 in this manner causes the annular area of stockinette fabric 12 between adjacent circumferential loops 18 to bunch up or slacken. The slack allows the meat to protrude or bulge radially outwardly beyond helical thread 14 to form ripples 16.

The type of drawing means illustrated in FIG. 2 may produce longitudinal marks in the finished meat product that potentially detract from its appearance because longitudinal extension loops 28 may indent the meat to some extent.

Figure 4:
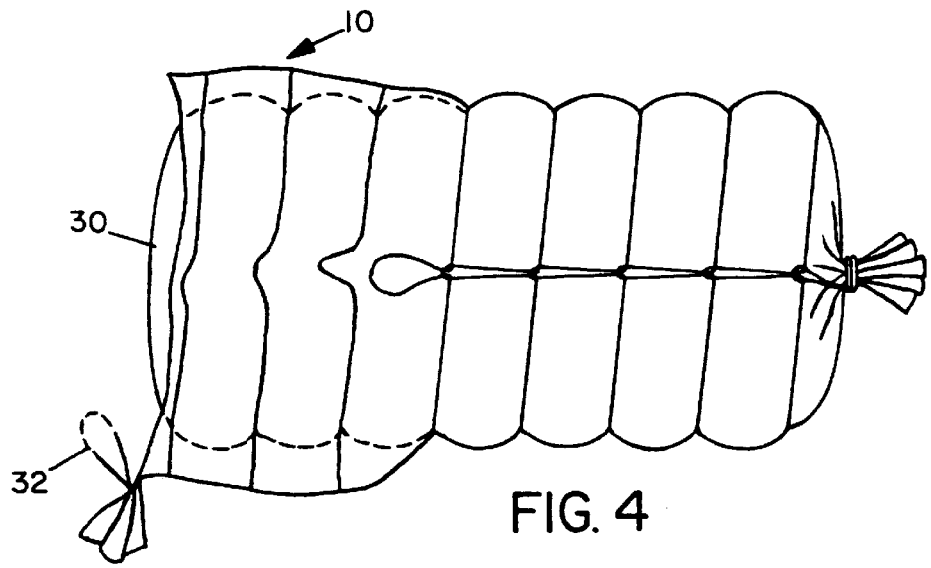
FIG. 4 is a side elevational view of a casing, illustrating a method for releasing a casing from a meat product.

Nevertheless, a grocer may display the meat product in an orientation in which any such longitudinal marks are beneath it and thus hidden from view. Such marks may be minimized by minimizing the number of longitudinal extension loops 28 of each circumferential loop 18. FIG. 4 illustrates a casing 10 in which each circumferential loop 18 has exactly one longitudinal extension loop 28. Any longitudinal mark left by this single chain of extension loops 28 can easily be hidden by resting the meat product in the display case with that side down. A tradeoff exists between minimizing the number of longitudinal extension loops 28 of each circumferential loop 18 and maximizing the drawing function. The greater the number of longitudinal extension loops 28 of each circumferential loop 18, the more thread is borrowed from that circumferential loop 18, and the greater the extent to which all circumferential loops 18 are drawn closer to one another in response to stuffing. To optimize this tradeoff, the location of longitudinal extension loops 28 may be limited to a region constituting approximately one third of the circumference of the helical restrictive structure. Any suitable number of parallel chains of longitudinal extension loops 28 may be included within this region. The region constituting approximately the remaining two-thirds of the circumference of the helical restrictive structure is preferably devoid of any longitudinal connections between circumferential thread loops because that is the region of the meat product visible to consumers.

A restrictive structure may have any suitable type or number of drawing means, but for the reasons described above it should remain substantially devoid of longitudinal connections, such as longitudinal extensions 28, between circumferential thread loops 18. As defined herein, a restrictive structure is "substantially devoid" of longitudinal connections if it leaves no longitudinal marks in the meat product that cannot be hidden from view by resting the meat product on them. For example, a restrictive structure having longitudinal extension loops 28 disposed only in a region constituting one-third of its circumference is substantially devoid of longitudinal connections.

As illustrated in FIG. 4, a further aspect of the present invention relates to a novel method for releasing casing 10 from the meat product 30 formed therein. The method by which meat product 30 may be formed is described in further detail below. Nevertheless, following processing, the endmost longitudinal extension 32 may be severed, as illustrated by the dashed line in FIG. 4. As a result, each successive longitudinal extension loop 28 in the chain in turn releases from an adjacent longitudinal extension loop 28. As it is released, each circumferential loop 18 relaxes and borrows from its longitudinal extension loop 28, thereby expanding in diameter. The collective result is that casing 10 relaxes, and thus may readily be removed from meat product 30. Casing 10 may be impregnated with a suitable foodgrade acidic material, such as vinegar or liquid smoke, to further enhance removability, as known in the art. Casing 10 may also be coated with or laminated to a smoke-permeable film, such as cellulose, (not shown) to similarly enhance removability. If a cellulose film is included, the density of stockinette fabric 12 may be reduced (i.e., the inter-stitch spacing may be increased) because the film is impermeable to meat particles.

Figure 5:
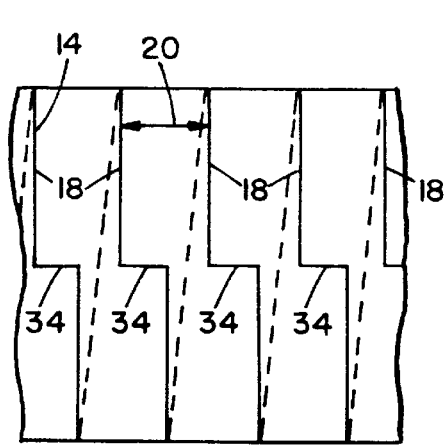
FIG. 5 is a side elevational view of an alternative helical restrictive structure in which each circumferential loop of the helix has a longitudinal jump when the casing is in a relaxed, unstuffed state.
Figure 6:
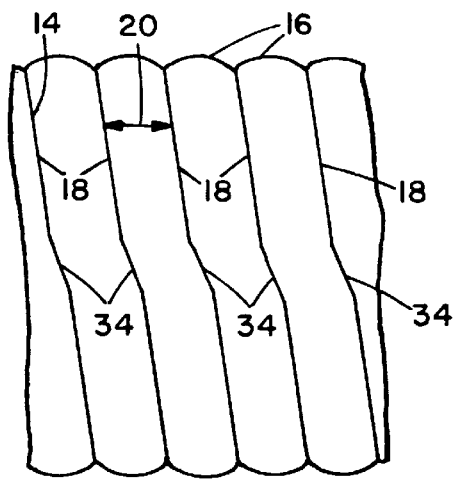
FIG. 6 is a side elevational view of the casing of FIG. 5 in a distended or stuffed state.

FIG. 5 illustrates an alternative means for drawing circumferential loops 18 together. In the embodiment illustrated in FIG. 2, the drawing means is defined by a longitudinal jump 34 in each of circumferential loops 18. No portion of longitudinal jump 34 is knitted with stockinette fabric 12. Longitudinal jumps 34 promote a decrease in longitudinal spacing 20 in response to the pressure exerted during stuffing. As illustrated in FIG. 6, in response to the stuffing pressure, the diameter of the restrictive structure defined by helical thread 14 increases. The radial expansion of each circumferential loop 18 is permitted by the straightening of its longitudinal jump 34. The collective effect is to draw all circumferential loops 18 closer to one another. Shortening longitudinal spacing 20 in this manner causes the annular area of stockinette fabric 12 between adjacent circumferential loops 18 to bunch up or slacken. The slack allows the meat to protrude or bulge radially outwardly beyond helical thread 14 to form ripples 16. This type of drawing means is advantageous because it does not include any longitudinal connections between adjacent circumferential loops 18 that could produce undesirable longitudinal marks in the finished meat product.

Figure 7:
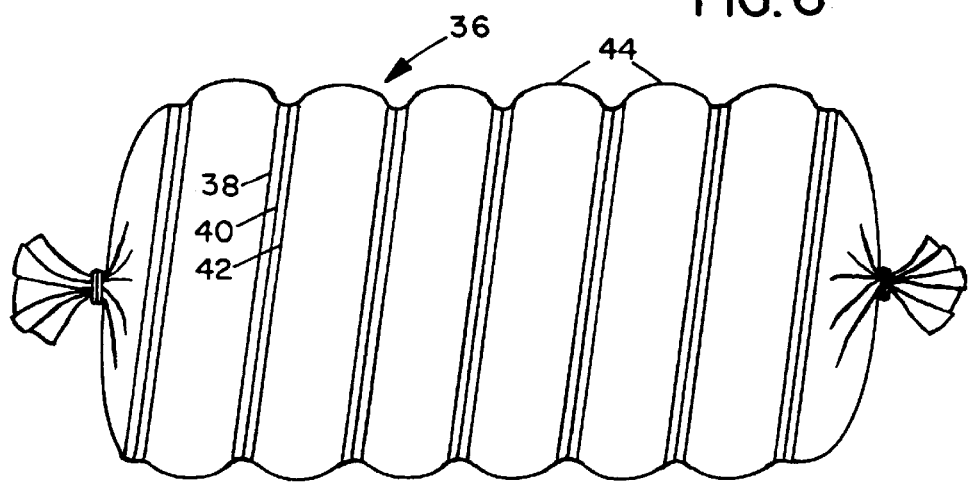
FIG. 7 is a side elevational view of a stuffed casing having a helical restrictive structure comprising three individual threads.
Figure 8:
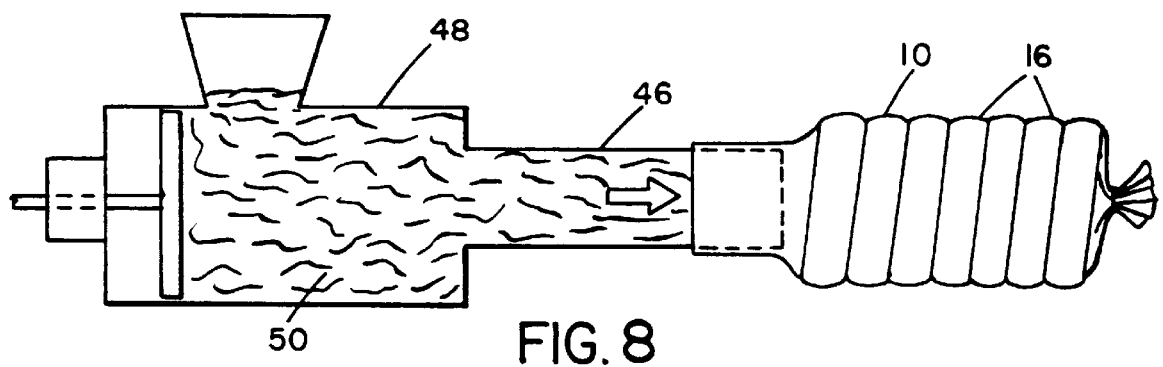
FIG. 8 illustrates the step of stuffing the casing until a pronounced helical bulge or ripple forms.

As illustrated in FIG. 7, another alternative casing 36 includes not one helical thread 14, as described above, but two or more helical threads, such as helical threads 38, 40 and 42. Helical threads 38, 40 and 42 are longitudinally spaced very closely to one another relative to longitudinal spacing 20. For example, helical threads 38, 40 and 42 may be spaced from one another by only one or two rows, whereas longitudinal spacing 20 may be 23 rows. Including multiple threads 38, 40 and 42 in this manner rather than a single thread 14 enables ripples 44 to be created in the meat product that are smoother and more wave-like than ripples 16 in the single-thread embodiment described above. As illustrated in FIG. 4, for example, a casing 10 having a single thread 14 produces a sharper, more cusp-like depression in meat product 30. Smoother ripples 44 may be more appealing and may enhance the marketability of the meat product FIG. 8 illustrates the stuffing step of the method of forming a meat product in accordance with the present invention. To form a meat product using a casing of the present invention, such as casing 10, casing 10 is placed on a stuffing horn 46 of a stuffing machine 48. As described below, the casing material is knitted in a long section and cut to the desired length. Thus, a length of casing 10 suitable for stuffing one ham or a long pre-shirred section suitable for stuffing many hams may be place on stuffing horn 46. An end of casing 10 is clipped closed with a suitable clip, and a raw meat mixture 50 is pushed through horn 46 into casing 10. Casing 10 is stuffed in this manner until the desired ripples 16 form. The other end of casing 10 is then clipped closed.

Figure 9:
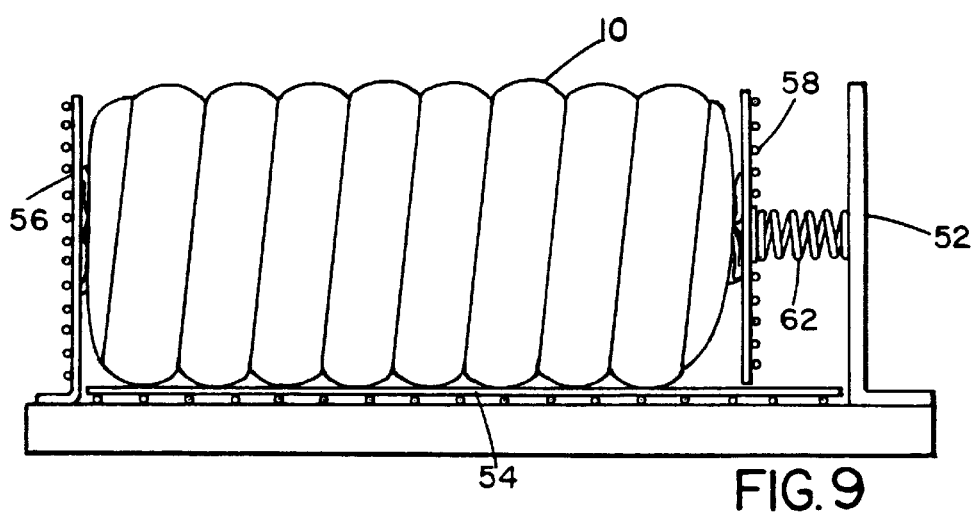
FIG. 9 illustrates a step of compressing the stuffed casing to enhance the ripple effect.
Figure 10:
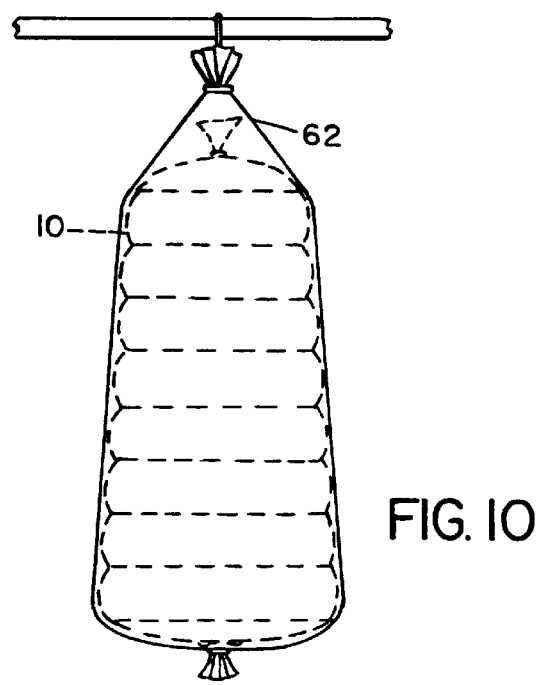
FIG. 10 illustrates a step of hanging the stuffed casing in a secondary stockinette to enhance the ripple effect.

The stuffed casing 10 may then be smoke-cooked in a smokehouse (not shown) in the conventional manner. Casing 10 is permeable to smoke as well as water vapor and air. As illustrated in FIG. 9, the ripple effect may be enhanced by compressing the stuffed casing 10 in a suitable compression device 52 prior to loading it into the smokehouse. Compression device 52 may comprise stainless steel screens 54, 56 and 58 and a spring 60. The stuffed casing 10 is laid on screen 54 between screens 56 and 58. Spring 60 biases screen 58 toward casing 10, thereby compressing casing 10 longitudinally against screen 56. FIG. 10 illustrates an alternative method for enhancing the ripple. In this method, the stuffed casing 10 is hung in a secondary stockinette 62, either in the smokehouse or beforehand, thereby compressing the stuffed casing 10 to some extent under its own weight. Furthermore, the tapering diameter resulting from the settling of the meat is desirable in a ham product and may enhance its marketability.

The following is a description of an exemplary set-up for a knitting machine to produce a casing such as casing 10, in accordance with the present invention. The example relates to a typical single-knit Jersey machine having 400 needles, 24 feeds and three tracks. Therefore, in its basic set-up, the machine can knit a tubular Jersey fabric consisting of a maximum of 400 columns or wales and 24 rows per revolution of the cam mechanism. The machine is not illustrated in this specification because those of skill in the art will readily understand these descriptions without further illustrations. As understood in the art, the feeds are designated as feed numbers 1–24, and the tracks as track numbers 1–3. Feed number 1 is set up to feed helical thread 14, and feed numbers 2–24 are set up to feed the thread from which stockinette fabric 12 is knitted. For example, helical thread 14 may be 600 denier polyester yarn, while stockinette fabric 12 may be knitted from 100 denier polyester yarn. All cams on all tracks for feeds 2–24 are set up as ordinary knit cams. Therefore, every revolution of the mechanism will knit 23 rows by 400 wales of Jersey stitches. Track number 1 on feed number 1 is set up as a "tuck" cam. The cams on all other tracks for feed number 1 are set up as "welt" cams. Every third needle is selected to run on this track. That means that every third needle at this feed will rise partially to form a tuck stitch rather than casting off the previous stitch, and will hook the helical thread 14, pull it down into the fabric, and hold it until the cam of the following feed releases it to knit the following Jersey stitch. This technique causes the Jersey stitches at the attachment points to transfer to the inside of helical thread 14, thereby trapping or attaching helical thread 14 to the Jersey fabric.

To create longitudinal extension loops 28, one needle is selected to run on track number 2. Feed number 1, which feeds helical thread 14, has a knit cam in its track number 2. For feeds 2–24, track number 2 is set up with welt cams (inactive). Therefore, the needle on track number 2, after hooking and pulling down the heavy yarn at feed number 1, will hold it down, creating longitudinal extension loops 28, while feeds 2–24 continue knitting the Jersey fabric. After the needle makes a complete revolution, it is again positioned at feed number 1, where it will cast off the stitch just held, and again hook helical thread 14 to be inter-knitted or linked with the previous and subsequent longitudinal extension loops 28 in the chain.

To create longitudinal jumps 34, feed number 1 is set up so that it can be moved out of the range in which it is capable of feeding the needles with helical thread 14. The set-up is such that, for one revolution, feed number 1 is feeding the yarn and the next revolution is not. This process alternates every revolution. Therefore, assuming all the other 23 feeds are active, helical thread 14 will jump 23 rows every revolution, at the point feed number 1 alternates its feeding. Modifying the set-up from that which produces a casing not having circumferential jumps, in which the helical thread is laid in every 23 rows, increases the longitudinal spacing to 46 rows.

In the illustrative embodiments described above, the casing and method of the present invention produce a meat product having a single helical bulge extending between the ends of the meat product. To most observers, this helical bulge closely resembles the series of annular bulges characteristic of a traditional ripple ham. The present invention overcomes the difficulties that would be inherent in knitting a casing having circumferential loops that are truly annular rather than helical.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A casing for forming a rippled meat product, comprising:
    a generally tubular stockinette fabric comprising knitted threads; and
    a restrictive structure having a circumference and comprising a plurality of circumferential loops integrally knitted with said stockinette fabric and spaced from one another by a longitudinal spacing, said restrictive structure having a drawing means for inhibiting an increase in said longitudinal spacing but said restrictive structure being devoid of longitudinal connections between said circumferential loops over at least two-thirds of its circumference.

2. The casing recited in claim 1, wherein a ratio of said longitudinal spacing to a diameter of said circumferential loops is between about 0.1 and 0.3.

3. The casing recited in claim 1, wherein said plurality of circumferential loops each comprises a plurality of individual threads spaced from one another by a spacing less than said longitudinal spacing.

4. A casing for forming a rippled meat product, comprising:
    a generally tubular stockinette fabric comprising knitted threads; and
    a restrictive structure comprising a plurality of circumferential loops integrally knitted with said stockinette fabric and spaced from one another by a longitudinal spacing, each of said circumferential loops having exactly one longitudinal connection connected to an adjacent one of said circumferential loops.

5. The casing recited in claim 4, wherein said plurality of circumferential loops each comprises a plurality of individual threads spaced from one another by a spacing less than said longitudinal spacing.

6. The casing recited in claim 4, wherein a ratio of said longitudinal spacing to a diameter of said circumferential loops is between about 0.1 and 0.3.

7. The casing recited in claim 4, wherein each said longitudinal connection is a loop drawn from a circumferential loop and through which another said longitudinal connection of an adjacent circumferential loop extends.

8. The casing recited in claim 4, wherein said plurality of circumferential loops together define a helix.

9. The casing recited in claim 8, wherein each said longitudinal connection is a loop drawn from a circumferential loop and through which another said longitudinal connection of an adjacent circumferential loop extends.

10. The casing recited in claim 9, wherein a ratio of a maximum diameter of said stockinette fabric to a maximum diameter of said circumferential loops is between 1.02 and 1.20.

11. A casing for forming a rippled meat product, comprising:
    a generally tubular stockinette fabric comprising knitted threads and having a first radial stretch capacity; and
    a restrictive structure having a circumference and comprising a plurality of circumferential loops integrally knitted with said stockinette fabric and spaced from one another by a longitudinal spacing, said restrictive structure having a second radial stretch capacity less than said first radial stretch capacity, said restrictive structure having a drawing means for decreasing said longitudinal spacing in response to an increase in pressure exerted radially outwardly from within said stockinette fabric but said restrictive structure being devoid of longitudinal connections between said circumferential loops over at least two-thirds of its circumference.

12. The casing recited in claim 11, wherein said plurality of circumferential loops each comprises a plurality of individual threads spaced from one another by a spacing less than said longitudinal spacing.

13. A casing for forming a rippled meat product, comprising:
    a generally tubular stockinette fabric comprising knitted threads; and
    a restrictive structure comprising a plurality of circumferential loops integrally knitted with said stockinette fabric and spaced from one another by a longitudinal spacing, each of said circumferential loops having a circumference and a plurality of longitudinal connections connected to an adjacent one of said circumferential loops, each longitudinal connection disposed within a region of a circumferential loop constituting about one third of said circumference, another region of said circumferential loop constituting about two-thirds of said circumference being devoid of any longitudinal connections.

14. The casing recited in claim 13, wherein said plurality of circumferential loops each comprises a plurality of individual threads spaced from one another by a spacing less than said longitudinal spacing.

15. The casing recited in claim 13, wherein a ratio of said longitudinal spacing to a diameter of said circumferential loops is between about 0.1 and 0.3.

16. The casing recited in claim 13, wherein each said longitudinal connection is a loop drawn from a circumferential loop and through which another said longitudinal connection of an adjacent circumferential loop extends.

17. The casing recited in claim 13, wherein said plurality of circumferential loops together define a helix.

18. The casing recited in claim 17, wherein each said longitudinal connection is a loop drawn from a circumferential loop and through which another said longitudinal connection of an adjacent circumferential loop extends.

19. The casing recited in claim 18, wherein a ratio of a maximum diameter of said stockinette fabric to a maximum diameter of said circumferential loops is between 1.02 and 1.20.

20. A casing for forming a rippled meat product, comprising:
    a generally tubular stockinette fabric comprising knitted threads; and
    a restrictive structure having a circumference and comprising a plurality of circumferential loops integrally knitted with said stockinette fabric and spaced from one another by a longitudinal spacing, said restrictive structure having a drawing means for decreasing said longitudinal spacing in response to an increase in pressure exerted radially outwardly from within said stockinette fabric but said restrictive structure being devoid of longitudinal connections between said circumferential loops over at least two-thirds of its circumference.

21. The casing recited in claim 20, wherein said plurality of circumferential loops each comprises a plurality of individual threads spaced from one another by a spacing less than said longitudinal spacing.

22. A casing for forming a rippled meat product, comprising:
    a generally tubular stockinette fabric comprising knitted threads; and
    a restrictive structure comprising a helical thread integrally knitted with said stockinette fabric, said helical thread defined by a plurality of circumferential loops spaced from one another by a longitudinal spacing, each of said circumferential loops having a longitudinal jump for decreasing said longitudinal spacing in response to an increase in pressure exerted radially outwardly from within said stockinette fabric.

23. The casing recited in claim 22, wherein said restrictive structure comprises a plurality of said helical threads spaced from one another by a spacing less than said longitudinal spacing.

24. The casing recited in claim 22, wherein each said circumferential loop has exactly one longitudinal jump.

25. The casing recited in claim 22, wherein a ratio of a maximum diameter of said stockinette fabric to a maximum diameter of said circumferential loops is between 1.02 and 1.20.

26. A method for forming a rippled meat product, comprising the steps of:
    providing a casing comprising:
        a generally tubular stockinette fabric having knitted threads; and
        a restrictive structure comprising a plurality of circumferential loops integrally knitted with said stockinette fabric and spaced from one another by a longitudinal spacing, said restrictive structure having a circumference and a drawing means for inhibiting an increase in said longitudinal spacing but said restrictive structure being devoid of longitudinal connections between adjacent circumferential loops over at least two-thirds of its circumference; and
    stuffing said casing with a meat material to form a stuffed casing, said stuffing increasing pressure in a direction radially outwardly from within said stockinette fabric until said stockinette fabric bulges between said circumferential loops in response to said pressure.

27. The method recited in claim 26, wherein:

said drawing means decreases said longitudinal spacing in response to an increase in pressure exerted radially outwardly from within said stockinette fabric; and said stuffing step comprises stuffing said casing until said longitudinal spacing decreases.

28. The method recited in claim 27, wherein said stuffing step comprises stuffing said casing until a ratio of a maximum diameter of said stockinette fabric to a maximum diameter of said circumferential loops is between 1.02 and 1.20.

29. The method recited in claim 26, further comprising the step of longitudinally compressing the stuffed casing to enhance rippling.

30. The method recited in claim 29, wherein said compressing step comprises the step of longitudinally compressing the stuffed casing under its own weight.

31. The method recited in claim 30, wherein said step of longitudinally compressing the stuffed casing under its own weight comprises the step of hanging the stuffed casing in a secondary stockinette.

32. A method for releasing a casing from a meat product, comprising the steps of:

providing a casing, comprising:
- a generally tubular stockinette fabric having knitted threads; and
- a restrictive structure comprising a plurality of circumferential loops integrally knitted with said stockinette fabric and spaced from one another by a longitudinal spacing, each of said circumferential loops having a longitudinal connection comprising a loop drawn from said circumferential loop and through which another said longitudinal connection of an adjacent circumferential loop extends; and severing an endmost longitudinal connection that extends through an adjacent longitudinal connection to release said adjacent longitudinal connection;

whereby each successive longitudinal connection in turn releases from an adjacent one of said longitudinal connections.

33. A method for forming a rippled meat product, comprising the steps of:

providing a casing comprising:
- a generally tubular stockinette fabric having knitted threads; and
- a restrictive structure comprising a plurality of circumferential loops integrally knitted with said stockinette fabric and spaced from one another by a longitudinal spacing;

stuffing said casing with a meat material to form a stuffed casing, said stuffing increasing pressure in a direction radially outwardly from within said stockinette fabric until said stockinette fabric bulges between said circumferential loops in response to said pressure; and longitudinally compressing the stuffed casing to enhance rippling.

34. The method recited in claim 33, wherein said compressing step comprises the step of longitudinally compressing the stuffed casing under its own weight.

35. The method recited in claim 33, wherein said step of longitudinally compressing the stuffed casing under its own weight comprises the step of hanging the stuffed casing in a secondary stockinette.

* * * * *